United States Patent

Atkinson et al.

[15] 3,666,821

[45] May 30, 1972

[54] DEUTERATED METHYLENE CHLORIDE

[72] Inventors: Joseph G. Atkinson, Montreal, Quebec; Erskine Simons, Jr., Niagara Falls, Ontario, both of Canada

[73] Assignee: Merck & Co., Inc., Rahway, N.J.

[22] Filed: Aug. 29, 1968

[21] Appl. No.: 756,298

[52] U.S. Cl. ..................................................260/664
[51] Int. Cl. ..............................C07c 17/00, C07c 19/02
[58] Field of Search....................................260/664

[56] References Cited

FOREIGN PATENTS OR APPLICATIONS 1,271,000   6/1968   Germany ................................260/664

OTHER PUBLICATIONS

Hine et al., J. Am. Chem. Soc. 76, 827–829 (1954).
Cram et al., J. Am. Chem. Soc. 83, 3688–3707 (1961).
Ambrus et al., Chemical Abstracts, 60, 6739[f] (1964).

*Primary Examiner*—Daniel D. Horwitz
*Attorney*—Joseph W. Molasky, J. Jerome Behan and I. Louis Wolk

[57] ABSTRACT

A method for the preparation of methylene-d2 chloride which comprises treating methylene chloride with (1) deuterium oxide in the presence of a catalyst and solvent; (2) a deuterated solvent in the presence of a catalyst; or (3) deuterium oxide in the presence of a deuterated catalyst and a deuterated solvent.

12 Claims, No Drawings

DEUTERATED METHYLENE CHLORIDE

The present invention relates to an improved process for the preparation of methylene-d2 chloride.

Methylene-d2 chloride has been prepared heretofore by methods which are expensive due to the choice of reactants and conditions of the reactions. For example, Bannard et al., Can. J. Chem. 31, 351, (1953), have shown the preparation of methylene-d2 chloride by causing a reaction between formaldehyde-d2 and phosphorous pentachloride. The disadvantages of this synthesis are low yields and the high cost of formaldehyde-d2. Others, such as Myers et al., J. Chem. Phys., 20, 1420 (1952) and Shimanouchi et al., J. Mol. Spectroscopy, 8, 222 (1962), have prepared methylene-d2 chloride by selective reduction of deuterochloroform in the presence of zinc metal and acetic acid–OD. This method also gives low or erratic yields and it is necessary to use two deuterated reagents which are appreciably more expensive than deuterium oxide.

In accordance with the present invention there is now provided an improved process for preparing methylene-d2 chloride from methylene chloride wherein 5 percent to 99.5 percent of the hydrogens are replaced by deuterium.

In its broadest aspects, the process of the present invention comprises deuterating methylene chloride with a source of deuterium provided from deuterium oxide in the presence of a catalyst and a suitable solvent, a deuterated solvent in the presence of a catalyst, or deuterium oxide in the presence of a deuterated catalyst and a deuterated solvent.

The deuteration is carried out by refluxing methylene chloride with a source of deuterium selected from the group consisting of deuterium oxide, a deuterated solvent, or a deuterated strong base acting as a catalyst-deuterating agent or a combination thereof. When the deuteration is carried out with deuterium oxide the reaction is carried out in the presence of a strong base which acts as a catalyst and a solvent selected so as to make the reaction mixture substantially homogeneous, i.e., so that a sufficient amount of methylene chloride dissolves in the reaction mixture. When the deuteration is carried out with a deuterated solvent the reaction is still carried out in the presence of a strong base which acts as a catalyst and, if desired, the strong base may itself be a deuterated strong base. In a further alternative method, the deuteration is carried out with deuterium oxide in the presence of a deuterated strong base as a catalyst and a deuterated solvent selected so as to make the reaction mixture substantially homogeneous.

As a suitable solvent it has been found that dimethylsulfoxide, hexamethylphosphorictriamide, 1-methyl-2-pyrrolidone and tetramethylurea can be used to provide a substantially homogenous mixture of the reactants. If desired pyridine and tetramethylenesulfone can also be used. If the solvent is to be used as a source of deuterium it is preferred to use dimethylsulfoxide-d6.

As suitable catalyst there is used a strong base which can be an alkali metal hydroxide, alkoxide, or hydride. As an example of suitable bases there may be mentioned sodium hydride, potassium hydride or lithium hydride, sodium hydroxide, potassium hydroxide or lithium hydroxide, potassium or sodium butoxide. If the catalyst is to be used as a further or added source of deuterium the strong base will be an alkali metal deuteroxide such as sodium or potassium deuteroxide.

The process of the present invention will be more readily understood by referring to the following examples which are given only to illustrate the process:

EXAMPLE 1
Methylene-d2 Chloride using Dimethylsulfoxide (DMSO)

To a 5 liter flask was added 350 ml. of $CH_2Cl_2$, 1,500 ml. dimethylsulfoxide, and 850 ml. of $D_2O$ containing 36 gm. of NaOD. The mixture was heated to reflux for 24 hours after which the methylene chloride was distilled off under vacuum and condensed in a liquid nitrogen cooled trip. Analysis by nuclear magnetic resonance showed it to contain 33 percent deuterium; recovery 320 ml. (91 percent). The reaction was repeated using the 320 ml. of product to give after 48 hours 220 ml. (69 percent) of methylene chloride containing 42 percent deuterium.

EXAMPLE 2

The material of Example 1 was mixed with 1,200 ml. of DMSO-d6 (0.93% D) and one liter of $D_2O$ containing 100 g. of NaOD and the whole heated to reflux. After 24 hours there was recovered by distillation 198 ml. (90 percent) of methylene chloride which was 91 percent deuterated. The exchange was repeated using the recovered methylene chloride, 1,000 ml. of DMSO-d6 (99.2 percent D), 800 ml. $D_2O$ and 80 gm. NaOD. After 24 hours reflux, there was obtained 158 ml. (80 percent) of methylene-d2 chloride which contained 93.6 percent deuterium. The overall yield of methylene-d2 chloride is 158/350 or 45 percent.

EXAMPLE 3
Methylene-d2 Chloride using Hexamethylphosphorictriamide (HMPT)

A mixture of 400 gm. of $CH_2Cl_2$, 300 gm. $D_2O$, 20 gm. NaOD and 1,500 gm. hexamethylphosphorictriamide was refluxed for 48 hours. The methylene chloride was recovered by distillation under vacuum into liquid nitrogen cooled trap; 390 gm. (98 percent) of 35 percent deuterated material was recovered. The exchange was repeated using 300 gm. $D_2O$, 20 gm. NaOD and 1,000 gm. HMPT. After 144 hours of reflux there was obtained 370 gm. (95 percent) of methylene chloride containing 75 percent D. The exchange was repeated with 400 gm. $D_2O$, 1,000 gm. HMPT and 20 gm. NaOD. After 96 hours relfux, there was obtained 352 gml of 97 percent deuterated methylene chloride. This material was exchanged once more under the same conditions and after 48 hours reflux there was obtained 335 gm. (95 percent) of methylene-d2 chloride containing 99% D. overall yield: 335/400 = 84 percent.

EXAMPLE 4

Forty-two grams of dimethyl-d6 sulfoxide was flushed with dry nitrogen while being stirred vigorously. To the stirred dimethyl-d6 sulfoxide was added 5.5 g. (0.05 mole) of potassium tertiary-butoxide. The mixture was heated to 70° C. for 1 hour, cooled and 13 ml. of methylene chloride added dropwise. The reaction mixture quickly turned dark and the temperature rose from 27° C. to 50° C. The reaction was cooled and addition was completed at 25° C. Following addition, the mixture was heated to reflux for 17 hours. Distillation under vacuum then yielded deuterated methylene chloride containing a small amount of tertiary-butyl alcohol as an impurity. Purification gave 6 ml. (46 percent) of methylene chloride containing 88.1 atom percent deuterium.

EXAMPLE 5

By proceeding in the same manner as in Example 4, but using potassium deuteroxide instead of sodium hydride and refluxing at a temperature of 60° C. for 42 hours there is obtained methylene-d2 chloride which is 89 percent deuterated at a yield of 38 percent.

EXAMPLES 6–9

By proceeding in the same manner as in Examples 1 or 2 and varying the catalyst and/or solvent the following results are obtained:

| Ex. | catalyst | Deuterium source | solvent | %D | yield | temp.° time |
|---|---|---|---|---|---|---|
| 5 | NaOD | $D_2O$ | DMSO–d6 | 57 | 66 | 65°C. 66 hr. |
| 6 | NaOD | $D_2O$ | DMSO–d6 | 87 | 99 | 65°C. 16 hr. |
| 7 | NaOH | $D_2O$ | (a) | 68 | 80 | 60°C. 24 hr. |
| 8 | NaOD | $D_2O$ | (b) | 48 | 90 | 60°C. 24 hr. |

(a) 1-methyl-2-pyrrolidone
(b) tetramethyl urea

The embodiments of the invention in which an exclusive property or privilege is claimed are defined as follows:

1. A process for preparing methylene-d2 chloride, which comprises deuterating methylene chloride by refluxing said methylene chloride with:

a. deuterium oxide in the presence of a strong base as catalyst and a solvent selected from the group consisting of dimethylsulfoxide, deuterated dimethylsulfoxide, hexamethylphosphorictriamide, 1-methyl-2-pyrrolidone, tetramethylurea, pyridine and tetramethylsulfone; and b. deuterated dimethylsulfoxide in the presence of a strong base as catalyst.

2. The process defined in claim 1, wherein the strong base is an alkali metal hydroxide, alkoxide, hydride or deuteroxide.

3. A process for preparing methylene-d2 chloride, which comprises refluxing methylene chloride with deuterium oxide in the presence of sodium deuteroxide and dimethylsulfoxide.

4. A process for preparing methylene-d2 chloride, which comprises refluxing methylene chloride with deuterium oxide in the presence of sodium deuteroxide and hexamethylphosphorictriamide.

5. A process for preparing methylene-d2 chloride, which comprises refluxing methylene chloride with dimethylsulfoxide-d6 in the presence of sodium hydride.

6. A process for preparing methylene-d2 chloride, which comprises refluxing methylene chloride with dimethylsulfoxide-d6 in the presence of potassium deuteroxide.

7. A process for preparing methylene-d2 chloride, which comprises refluxing methylene chloride with deuterium oxide in the presence of sodium deuteroxide and dimethylsulfoxide-d6.

8. A process for preparing methylene-d2 chloride, which comprises refluxing methylene chloride with deuterium oxide in the presence of sodium hydroxide and 1-methyl-2-pyrrolidone.

9. A process for preparing methylene-d2 chloride, which comprises refluxing methylene chloride with deuterium oxide in the presence of sodium deuteroxide and tetramethylurea.

10. A process for preparing methylene-d2 chloride, which comprises deuterating methylene chloride by refluxing said methylene chloride with deuterium oxide in the presence of a strong base and a solvent selected from the group consisting of dimethylsulfoxide, deuterated dimethylsulfoxide, hexamethylphosphorictriamide, 1-methyl-2-pyrrolidone, tetramethylurea, pyridine and tetramethylsulfone.

11. A process for preparing methylene-d2 chloride, which comprises deuterating methylene chloride by refluxing said methylene chloride with deuterated dimethylsulfoxide in the presence of a strong base.

12. A process for preparing methylene-d2 chloride, which comprises deuterating methylene chloride by refluxing said methylene chloride with deuterium oxide in the presence of a strong base and dimethylsulfoxide.

* * * * *